(12) United States Patent
Ma

(10) Patent No.: US 6,996,182 B2
(45) Date of Patent: Feb. 7, 2006

(54) METHOD FOR MOTION ESTIMATION IN VIDEO CODING

(75) Inventor: Shyh-Yih Ma, Taipei (TW)

(73) Assignee: Vivotek Inc., Taipei (TW)

( * ) Notice: Subject to any disclaimer, the term of this patent is extended or adjusted under 35 U.S.C. 154(b) by 674 days.

(21) Appl. No.: 10/241,593

(22) Filed: Sep. 12, 2002

(65) Prior Publication Data

US 2003/0067987 A1 Apr. 10, 2003

(30) Foreign Application Priority Data

Oct. 9, 2001 (TW) .............................. 90125019 A

(51) Int. Cl.
*H04N 7/12* (2006.01)
(52) U.S. Cl. .................. 375/240.16; 382/236; 348/699
(58) Field of Classification Search .......... 375/240.16, 375/240.24; 382/107, 236; 348/699, 416.1
See application file for complete search history.

(56) References Cited

U.S. PATENT DOCUMENTS 5,696,836 A * 12/1997 Yoshino et al. ............. 382/107
5,781,249 A * 7/1998 Hwang ....................... 348/699
5,838,827 A * 11/1998 Kobayashi et al. ......... 382/236

* cited by examiner

*Primary Examiner*—Gims Philippe
(74) *Attorney, Agent, or Firm*—Birch, Stewart, Kolasch & Birch, LLP

(57) ABSTRACT

A method for motion estimation in video coding. The row containing a motion vector predictor is determined as a P-th row and the rows adjacent to the P-th row are the (P+1)-th row and the (P−1)-th row. The method includes the following steps: (a) calculating of the distortions corresponding to all points in the P-th, (P+1)-th, and (P−1)-th rows respectively; (b) comparing all distortions, (c) determining whether or not the point with a minimum distortion is in the P-th row, and if yes, the method proceeds to step (g); (d) determining whether or not the point with a minimum distortion is in the (P+1)-th row, and if yes, the method proceeds to step (f); (e) decreasing P by 1, calculating the corresponding distortions of all points in the (P−1)-th row respectively, and repeating step (b); (f) increasing P by 1, calculating the corresponding distortions of all points in the (P+1)-th row respectively, and repeating step (b); and (g) determining a corresponding motion vector from the point with a minimum distortion.

6 Claims, 2 Drawing Sheets

METHOD FOR MOTION ESTIMATION IN VIDEO CODING

This application incorporates by reference Taiwan application Serial No. 090125019, filed on Oct. 9, 2001.

BACKGROUND OF THE INVENTION

1. Field of the Invention

The invention relates in general to a method for motion estimation in video encoding, and more particularly to a method using a motion vector predictor for motion estimation in video encoding.

2. Description of the Related Art

Nowadays, the multimedia field has become very popular and is widely applied in our daily life. In recent years, it has become a trend to use MPEG-4 for the multimedia image. The platform for MPEG-4 demands flexibility of applying multiple and different equipment, and powerful capability of data processing in order to achieve instant effect which is required when processing image. Since a multimedia processor combines the flexibility of a programmable processor and the computing ability of a parallel architecture, it is chosen as a platform of an image processing system.

In the process of image encoding, most of the computing resource is occupied by block matching motion estimation. The easiest and most complete method of motion estimation is the full search algorithm. When proceeding with the block matching motion estimation, the algorithm compares each block of a reference frame respectively with a block of a current frame, and thus results in the best-matching block in the reference frame for the block of the current frame.

Each block corresponds to a checking point. Referring to FIG. 1, it illustrates the relation between the checking points and the blocks. For example, the checking points A and A1 respectively correspond to the blocks 102 and 104 in a reference frame. If the checking point A is moved left and downward by one pixel, it becomes the checking point A1. In this way, when the block 102 is shifted left and downward by one pixel, it results in the block 104.

The full search algorithm, as the term suggests, takes every point of a search region as a checking point, and compares all pixels between the blocks corresponding to all checking points of the reference frame and the block of the current frame. Then the best checking point is determined to obtain a motion vector value. The comparison technique is performed by computing the difference in the image information of all corresponded pixels, and then summing the absolute values of the differences in the image information. Finally, the sum of absolute difference (SAD) is performed. Then, among all checking points, the checking point with the lowest SAD is determined to be the best checking point. The block that corresponds to the best checking point is the block of the reference frame matching best with the block of the current frame that is to be encoded. And a motion vector can be obtained by these two blocks.

Even though some part of data can be reused when performing a full search algorithm, and generally there is a speed-up hardware for support in a system, the full search algorithm involves a huge amount of complex computations. For example, if the maximum number of pixels in a possible motion region is m, each block corresponding to the searching region has $(2m+1)^2$ checking points. And there are $N^2$ pixels in each block, so that it is necessary to process $N^2$ computations of SAD for each checking point in the searching region. Therefore, the number of computations in performing a full search algorithm for a block is $(2m+1)^2 \times N^2$. Such a huge amount of computation in a full search algorithm can sometimes occupy 80% of the computation of video processing.

For achieving the object of less computation, many block matching motion estimation algorithms have been developed, such as the three step search, new three step search, one-dimensional full search, four-step search, center-biased diamond search, and the advanced diamond zonal search which is well known. The computations of these algorithms are less than the full search algorithm, but the above algorithms cannot reduce the computation amount by effective data reuse.

SUMMARY OF THE INVENTION

It is therefore an object of the invention to provide a method for video coding motion estimation. By the invention, it is to substantially reduce the computation amount by data reuse and to effectively determine a motion vector.

The invention achieves the above-identified objects by providing a method for motion estimation in video coding. The method of the invention is to choose three coded blocks adjacent to the coding block, and to determine the individual motion vectors of the three blocks and the median of these vectors as a motion vector predictor. Then, the row with the motion vector predictor is determined as a P row; and the rows adjacent to the P-th row are a (P+1)-th row and a (P−1)-th row. The method includes the following steps: (a) calculating the respective distortions corresponding to all points in the P-th, (P+1)-th, and (P−1)-th rows are calculated respectively; (b) comparing all distortions; (c) determining whether or not the point with a minimum distortion is in the P-th row, if yes, then the method proceeds to step (g), and if no, then the method proceeds to step (d); (d) determining whether or not the point with a minimum distortion is in the (P+1)-th row, if yes, then the method proceeds to step (f), and if no, then the method proceeds to step (e); (e) decreasing P by 1, calculating the corresponding distortions of all points in the (P−1)-th row respectively; and repeating step (b); (f) increasing P by 1, calculating the corresponding distortions of all points in the (P+1)-th row respectively, and repeating step (b); and (g) determining a corresponding motion vector from the point with a minimum distortion.

BRIEF DESCRIPTION OF THE DRAWINGS

Other objects, features, and advantages of the invention will become apparent from the following detailed description of the preferred but non-limiting embodiments. The description is made with reference to the accompanying drawings in which.

DESCRIPTION OF THE PREFERRED EMBODIMENT

The motion estimation methods designed for reducing computation are partial search algorithms, which are different from the full search algorithm that searches all points in a searching region. The partial search algorithms search only part of the points in a searching region. The motion estimation algorithm of this invention is also a partial search algorithm. A partial search algorithm starts with a starting point in a searching region, proceeds with searching according to conditions determined by the algorithm, and stops when the best point (the point corresponding to the best matching block), which matches the conditions, is found. So, the closer the distance between the starting point and the best point is, the more effective the searching process can be. There is close relationship among adjacent blocks according to the characteristic that image motion is usually smooth and slow. Therefore, the starting point chosen in this invention is not the point of origin (0,0), which is normally chosen in other algorithms. The starting point chosen by the motion estimation algorithm of this invention is obtained as a motion vector predictor by the motion vectors of the adjacent blocks.

Figure 1:
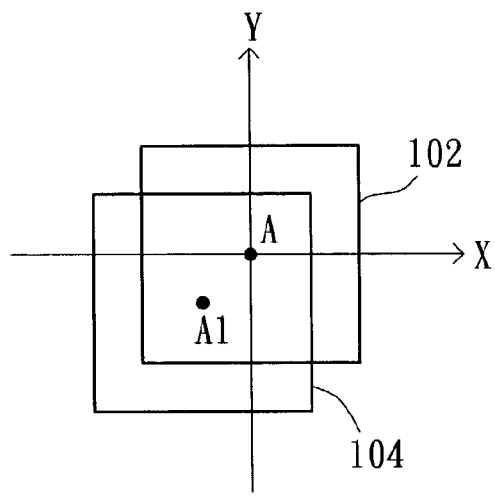
FIG. 1 illustrates the relationship between the checking points and their respective blocks.
Figure 2:
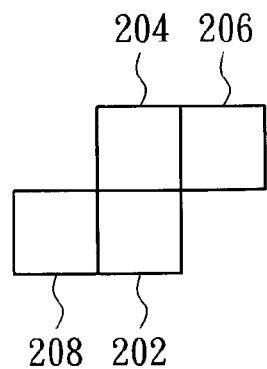
FIG. 2 illustrates the coding block in a current frame and its adjacent blocks.

Referring to FIG. 2, it illustrates the coding block in a current frame and its adjacent blocks. Block 202 is the block to be coded presently. The motion vector predictor of the block 202 can be determined by the following steps:

(a) Choose three coded blocks adjacent to the block 202, such as block 204, block 206 and block 208 in FIG. 2.

(b) Compare the motion vectors of blocks 204, 206, and 208, and determine the median of these three motion vectors.

(c) Set the median as the motion vector predictor of the coding block 202.

Another factor related to the efficiency of motion estimation is data reuse. The next checking point of most effective search algorithms is determined by the result of the current checking points. In this way, the location of the next checking point cannot be predicted. That is, there is no regularity in those search algorithms. Generally, a huge amount of data access is necessary in a motion estimation algorithm, and the amount of data access can be reduced by applying regular row search and data reuse.

Figure 3A:
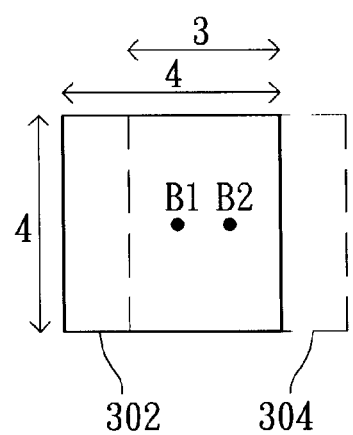
FIG. 3A illustrates data reuse when performing a regular search algorithm.

The characteristic of a regular row search is that the checking points in the search region are lined up in a consecutive row. In this way, when checking the checking points of the same row, the data can be reused. Referring to FIG. 3A, which illustrates data reuse when performing a regular search algorithm. It can be simply explained by taking a block with 4×4 pixels as an example. As shown in FIG. 3A, the block represented by a checking point B1 is block 302 that is 4×4 pixels in size. The checking point next to B1 is the checking point B2, which represents block 304, which is also 4×4 pixels in size. As shown in FIG. 3A, block 302 results in block 304 by moving one pixel to the right, and there are some overlaps between these two blocks. Therefore, a block 104 can be obtained by reusing the overlapping data (3×4 pixels) between blocks 302 and 304, and using data from pixels (1×4 pixels) at the right row. In this way, there are totally (4×4)+(1×4)=20 pixels involved when checking the checking points B1 and B2 by using a regular row search algorithm, wherein (4×4) represents pixels involved in checking the checking point B1, and (1×4) represents extra pixels involved in checking the checking point B2. The above formula can be simplified as (4+1)×4=20. A formula can be determined to calculate the number of pixels, N, involved when checking n+1 checking points by a regular row search algorithm, i.e. N=(x+n) p, wherein x is the length of a block corresponding to a checking point, and p is the width of the block.

Figure 3B:
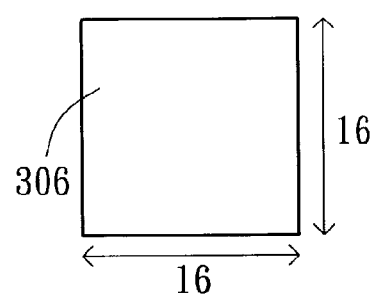
FIG. 3B illustrates a block in a current frame.
Figure 3C:
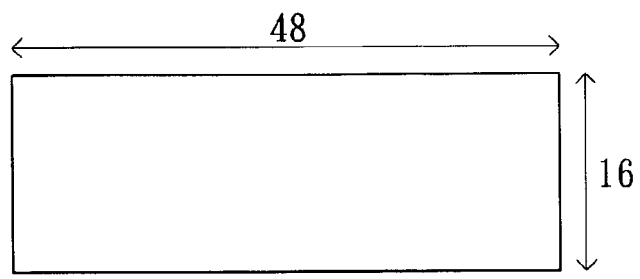
FIG. 3C illustrates the pixel needed for checking 33 checking points in a reference frame when searching a block corresponding to FIG. 3B by a regular search algorithm.

Referring to FIG. 3B, it illustrates a block in a current frame. In FIG. 3B, the length of a block 306 is 16 pixels, and the width is also 16 pixels, so the size of this block is 16×16=256 pixels. Referring to FIG. 3C, it illustrates the pixels needed for checking 33 lined-up checking points in a reference frame when searching a block corresponding to the block 306 in FIG. 3B by a regular row-search algorithm. In this way, the pixels needed for the 33 checking points are only (16+32)×16=768. In an irregular search algorithm, such as the diamond search algorithm, which is performed in a single point search, the data cannot be reused when searching a block in a reference frame corresponding to the block 306 in FIG. 3B. So in an irregular search algorithm, 16×16+16×16=512 pixels in the reference frame are involved in checking the first and the second points because there is no overlapping block corresponding to these two checking points. By comparing these two algorithms, 768 pixels for 33 checking points and 512 pixels for 2 checking points, it is proved that a regular row search algorithm can improve searching efficiency. According to the above-mentioned regular row search algorithm, the checking points in the searching region of a reference frame are adjacent points. In this way, the pixels in the block corresponding to these adjacent points can be reused, and the huge amount of data processing can be reduced because of the characteristic of data reuse.

The method of the invention, a method for motion estimation in video encoding, is a combination of the above methods of motion vector predictors and regular row search. When encoding a block of a current frame according to this method, a best-matching block corresponding to this block has to be determined from a reference frame, and a motion vector can be obtained from the best-matching block. A search region should be selected before applying this estimation method. The selected search region consists of multiple rows and lines. It includes a P-th row, a (P+1)-th row, and a (P−1)-th row, wherein P is an integral number. These three rows are adjacent, and the row where a motion vector predictor is located is determined as the P-th row.

The method for motion estimation in video coding of a first embodiment of this invention includes the following steps. (a) The distortion values corresponding to all points in the P-th, the (P−1)-th, and the (P+1)-th rows are calculated respectively. (b) All distortions are compared. (c) It is determined whether or not a minimum distortion value is in the P-th row. If yes, then the method proceeds to step (g). (d) A determination is made whether the point with a minimum distortion value is in the (P+1)-th row. If yes, then the method proceeds to step (f). (e) P is decreased by 1, and distortion values corresponding to all points in the (P−1)-th row are calculated. Then step (b) is repeated. (f) P is incremented by 1, and the distortion values corresponding to all points in the (P+1)-th row are calculated. Then step (b) is repeated, until the minimum distortion value is in the P-th row. Finally, the method proceeds to step (g), wherein a motion vector corresponding to the point with a minimum distortion value is defined.

A distortion value can be obtained by the following method. Firstly, the differences between the data of pixels of the block in the current frame and the corresponding data of the pixels of the related block in the reference frame are calculated. Next, the absolute values of the differences corresponding to the data of all pixels in the block are summed up as the sum of absolute difference (SAD) of the block in the reference frame. Then, the SAD is the distortion value.

Furthermore, at step (a), all points in the P-th, (P−1)-th, and (P+1)-th rows are checking points, and all points in the (P−1)-th row at step (f) are checking points.

Figure 4:
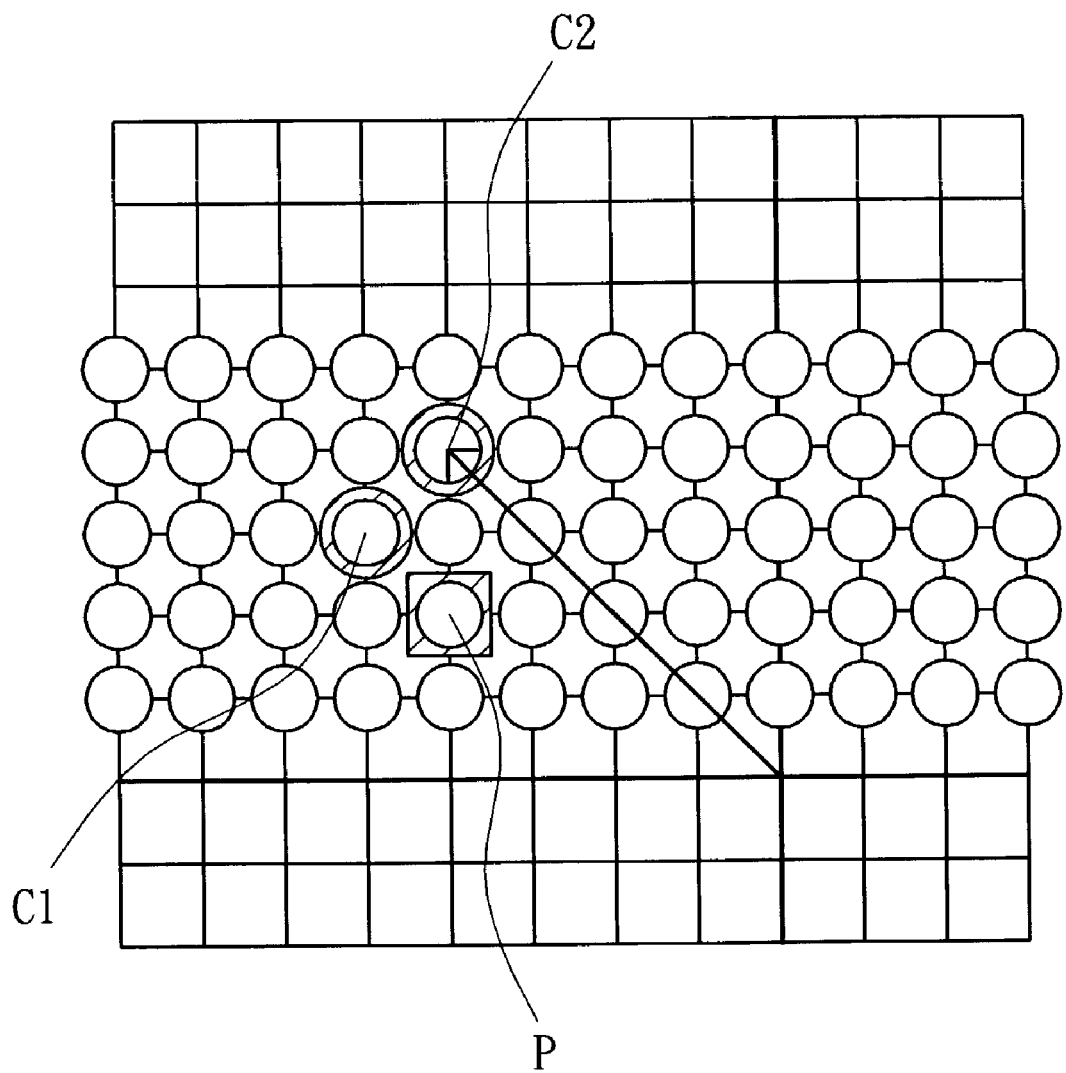
FIG. 4 illustrates an example of the applying the method for the motion estimation in video coding according to the first embodiment of the invention.

Referring to FIG. 4, it illustrates an example of applying the method for motion estimation in video coding according to the first embodiment of the invention. A motion vector predictor P is supposed to be at (−4,−2), its motion vector is (−4,−4), and the search region is (−16,15). Firstly, when the Y value of the motion vector predictor P is −2, all the points in the −1$^{st}$ row, the −2$^{nd}$ row, and the −3$^{rd}$ row are the checking points, wherein the −1$^{st}$ row, the −2$^{nd}$ row, and the −3$^{rd}$ row are corresponding to the above-mentioned (P+1)-th row, the P-th row, and the (P−1)-th row. After calculating each checking points in the 3 rows, the checking point with minimum distortion is determined, which is the checking point C1 at the location of (−5,−3). The value of the Y value of the checking point C1 is −3. From this value, we can know that the point is located in the (P−1)-th row. Next, the −3$^{rd}$ row is set as the P-th row, and the −4$^{th}$ row as the (P−1)-th row. Then, all distortion of checking points in the −4$^{th}$ row are calculated. The checking point C2, which is located at (−4,−4), is determined as the point with minimum distortion after checking the distortion of all points in the −3$^{rd}$ row and the 4$^{th}$ row. Because the checking point C2 is at the −4$^{th}$ row, the −4$^{th}$ is then set as the P-th row, and the method proceeds with searching the (P−1)-th row, which is the −5$^{th}$ row. None of the checking points with the distortion is smaller than the distortion of the checking point C2 at (−4, −4). Therefore, the block corresponding to the checking point C2 is the best-matching block. In this way, the vector (−4, −4) from origin to the checking point C2 is the motion vector.

The method for motion estimation in video coding of the second embodiment of this invention is illustrated as follows. The main difference between the first embodiment and the second embodiment is the condition of search-ending determination. In the first embodiment, the search process ends at step (c), wherein when the point with a minimum distortion is in the P-th row, the search process ends and the method proceeds with step (g) to determine the motion vector from the searched point with a minimum distortion. In the second embodiment, only the points within the search region are checked. The motion vector can be obtained by just determining the point with a minimum distortion in the search region. In addition, the point with a minimum distortion might appear within the search region, or in the edges of the search region, i.e. the uppermost or lowest row of the search region. Therefore, the second embodiment of this invention includes step (a') to step (g'). At step (a'), the distortion values corresponding to all points in the P-th, the (P−1)-th, and the (P+1)-th rows are calculated respectively, wherein the distortion values corresponding to all points in the (P−1)-th row do not need to be calculated if the (P−1)-th row is not within the search region; and the distortion values corresponding to all points in the (P+1)-th row do not need to be calculated if the (P+1)-th is not within the search region. Thus, only the distortion values of points within the search region are calculated. At step (b'), all distortion values are compared. At step (c'), a determination is made whether or not the point with a minimum distortion is in the P-th row, the uppermost or the lowest row of the search region. If yes, then the method proceeds to step (g'). If no, then the method proceeds to step (d'). At step (d'), a determination is made whether or not the point with a minimum distortion is in the P+1 row. If yes, then the method proceeds to step (f'). If no, then the method proceeds to step (e'). At step (e'), P is decremented by 1, and the distortion values corresponding to all points in the (P−1)-th row are calculated respectively. Then step (b') is repeated. At step (f'), P is incremented by 1, and the distortion values corresponding to all points in the (P+1)-th row are calculated respectively. Then step (b') is repeated. At step (g'), the motion vector can be determined from the point with a minimum distortion.

As disclosed above, the embodiments of the method for motion estimation in video encoding of the invention achieve the objects of reducing the huge amount of computation by applying the technique of data reuse, and effectively determining the best-matching checking point and the motion vector to complete the encoding.

While the invention has been described by way of examples and in terms of preferred embodiments, it is to be understood that the invention is not limited to the disclosed embodiments. To the contrary, it is intended to cover various modifications and similar arrangements and procedures, and the scope of the appended claims therefore should be accorded the broadest interpretation so as to encompass all such modifications and similar arrangements and procedures.

What is claimed is:

1. A method for motion estimation in video encoding for determining a motion vector corresponding to a first block in a current frame and a second block in a reference frame, wherein the second block in the reference frame is the best-matching block related to the first block in the current frame, a search region is predetermined and has a plurality of successive rows, including a (P−1)-th row, a P-th row, and a (P+1)-th row, each row of the search region has a plurality of points, and a motion vector predictor is located on the P-th row, the method comprising the steps of:
   (a) calculating the respective distortions corresponding to all points in the P-th, (P+1)-th, and (P−1)-th rows respectively;
   (b) comparing all distortions;
   (c) determining whether or not the point with a minimum distortion is in the P-th row, the uppermost or the lowest row of the search region, and if yes, then the method proceeds to step (g);
   (d) determining whether or not the point with a minimum distortion is in the (P+1)-th row, and if yes, then the method proceeds to step (f);
   (e) decreasing P by 1, calculating the corresponding distortions of all points in the (P−1)-th row respectively, and repeating step (b);
   (f) increasing P by 1, calculating the corresponding distortions of all points in the (P+1)-th row respectively, and repeating step (b);
   (g) determining a corresponding motion vector from the point with a minimum distortion.

2. A method according to claim 1, wherein the motion vector predictor is determined from the median of multiple motion vectors of multiple blocks adjacent to the first block.

3. A method according to claim 1, wherein the distortion is the sum of absolute difference (SAD).

4. A method for motion estimation in video encoding, for determining a motion vector corresponding to a first block in a current frame and a second block in a reference frame, wherein the second block in the reference frame is the best-matching block related to the first block in the current frame, a search region is predetermined and has a plurality of successive rows, including a (P−1)-th row, a P-th row, and a (P+1)-th row, each row of the search region has a plurality of points, and a motion vector predictor is located on the P-th row, the method comprising the steps of:

(a) calculating the distortions corresponding to all points in the P-th, (P+1)-th, and (P−1)-th rows respectively, wherein the distortion values corresponding to all points in the (P−1)-th row do not need to be calculated if the (P−1)-th row is not within the search region, and the distortion values corresponding to all points in the (P+1)-th row do not need to be calculated if the (P+1)-th is not within the search region;

(b) comparing all distortions;

(c) determining whether or not the point with a minimum distortion is in the P-th row, and if yes, then the method proceeds to step (g);

(d) determining whether or not the point with a minimum distortion is in the (P+1)-th row, and if yes, then the method proceeds to step (f);

(e) decreasing P by 1, calculating the corresponding distortions of all points in the (P−1)-th row respectively, and repeating step (b);

(f) increasing P by 1, calculating the corresponding distortions of all points in the (P+1)-th row respectively, and repeating step (b); and (g) determining a corresponding motion vector from the point with a minimum distortion.

5. A method according to claim 4, wherein the motion vector predictor is determined from the median of multiple motion vectors of multiple blocks adjacent to the first block.

6. A method according to claim 4, wherein the distortion is the sum of absolute difference (SAD).

* * * * *